(12) United States Patent
Adachi

(10) Patent No.: US 10,814,500 B2
(45) Date of Patent: Oct. 27, 2020

(54) CABLE CLAMP AND ROBOT

(71) Applicant: FANUC CORPORATION, Yamanashi (JP)

(72) Inventor: Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 16 days.

(21) Appl. No.: 16/274,503

(22) Filed: Feb. 13, 2019

(65) Prior Publication Data

US 2019/0291286 A1 Sep. 26, 2019

(30) Foreign Application Priority Data

Mar. 20, 2018 (JP) ................................. 2018-052830

(51) Int. Cl.
*B25J 19/00* (2006.01)
*H02G 11/00* (2006.01)

(52) U.S. Cl.
CPC .......... *B25J 19/0025* (2013.01); *H02G 11/00* (2013.01)

(58) Field of Classification Search
CPC ............................. B25J 19/0025; H02G 11/00
See application file for complete search history.

(56) References Cited

U.S. PATENT DOCUMENTS

| | | | |
|---|---|---|---|
| 6,371,800 B1 | 4/2002 | Kawaguchi | |
| 8,893,577 B2 * | 11/2014 | Ibayashi | B25J 19/0025 74/490.02 |
| 9,197,052 B2 * | 11/2015 | Kume | H02G 11/00 |
| 9,216,479 B2 * | 12/2015 | Takahashi | B23K 37/02 |
| 9,233,475 B2 * | 1/2016 | Kume | B25J 19/0025 |
| 9,440,363 B2 * | 9/2016 | Okahisa | B25J 18/04 |
| 9,481,095 B2 * | 11/2016 | Takahashi | B25J 17/02 |
| D792,917 S * | 7/2017 | Fischer | D15/199 |
| 9,751,219 B2 * | 9/2017 | Kono | F16L 3/23 |
| 9,757,864 B2 * | 9/2017 | Niu | B25J 19/0029 |
| 9,762,040 B2 * | 9/2017 | Ogawa | B60R 16/0215 |
| 9,764,483 B2 * | 9/2017 | Okahisa | B25J 18/00 |
| 9,770,831 B2 * | 9/2017 | Sakai | B25J 19/0025 |
| 9,975,239 B2 * | 5/2018 | Kinoshita | B25J 9/0027 |
| 10,099,367 B2 * | 10/2018 | Hirabayashi | B25J 9/12 |
| 10,589,419 B2 * | 3/2020 | Hahakura | B25J 17/02 |
| 10,618,161 B2 * | 4/2020 | Watanabe | B25J 9/06 |

(Continued)

FOREIGN PATENT DOCUMENTS

CN 1264946 A 8/2000
EP 1 032 105 A2 8/2000
(Continued)

OTHER PUBLICATIONS

Office Action dated Mar. 3, 2020, in corresponding Japanese Application No. 2018-052830; 9 pages.
(Continued)

*Primary Examiner* — David M Fenstermacher
(74) *Attorney, Agent, or Firm* — Maier & Maier, PLLC

(57) ABSTRACT

A cable clamp includes a base member fixed to a predetermined position of an arm of a robot, a rotation mechanism provided on the base member, and a clamp base rotatably supported by the base member using the rotation mechanism. The clamp base includes a band winding portion which a fixation band is wound around, the fixation band is for fixing cables to the clamp base.

8 Claims, 7 Drawing Sheets

(56) References Cited

U.S. PATENT DOCUMENTS

| | | |
|---|---|---|
| 2009/0095110 A1 | 4/2009 | Day et al. |
| 2010/0038495 A1 | 2/2010 | Jinushi et al. |
| 2014/0013893 A1 | 1/2014 | Asano et al. |
| 2014/0102240 A1 | 4/2014 | Inada et al. |
| 2015/0007681 A1 | 1/2015 | Murakami |
| 2016/0101528 A1 | 4/2016 | Inoue et al. |

FOREIGN PATENT DOCUMENTS

| | | |
|---|---|---|
| JP | S58-211888 A | 12/1983 |
| JP | S64-040295 A | 2/1989 |
| JP | H03-208584 A | 9/1991 |
| JP | H10-249784 A | 9/1998 |
| JP | H11-028691 A | 2/1999 |
| JP | 2002-102250 A | 4/2002 |
| JP | 2008-232174 A | 10/2008 |
| JP | 4565029 B2 | 10/2010 |
| JP | 2012-081528 A | 4/2012 |
| JP | 2012-240123 A | 12/2012 |
| JP | 2014-030893 A | 2/2014 |
| JP | 2014-065072 A | 4/2014 |
| JP | 2015-013343 A | 1/2015 |
| JP | 2015-085469 A | 5/2015 |
| JP | 2015-104764 A | 6/2015 |
| JP | 2016-078146 A | 5/2016 |

OTHER PUBLICATIONS

Search Report dated Feb. 26, 2020, in corresponding Japanese Application No. 2018-052830; 20 pages.
Chinese Office Action dated Jul. 30, 2020, in connection with corresponding CN Application No. 201910198882.X (15 pp., including machine-generated English translation).

* cited by examiner

CABLE CLAMP AND ROBOT

CROSS-REFERENCE TO RELATED APPLICATIONS

This application is based on and claims priority to Japanese Patent Application No. 2017-052830 filed on Mar. 20, 2018, the content of which is incorporated herein by reference in its entirety.

FIELD

The present invention relates to a cable clamp and a robot, and in particular, to a cable clamp attached to a robot.

BACKGROUND

At a distal end portion of a robot, a tool for handling, welding or the like is attached. Therefore, the robot is provided with a cable for transmitting electrical power and signals to the tool, and a cable for supplying power source such as air and oil to the tool.

Here, the robot includes a plurality of arm members, and the plurality of arm members move with respect to each other. Therefore, the cable has an extra length considering movement of the robot, so that the cable may not be broken or damaged due to the movement of the robot.

Further, in order to prevent unintentional behavior of the cable due to the movement of the robot, a cable clamp is fixed to the robot, and a middle section of the cable is fixed to the cable clamp (cf. Japanese Unexamined Patent Application, Publication No. 2015-104764).

Moreover, there is known a robot whose distal-side arm member is supported at a distal end portion of a proximal side arm member, and the distal-side arm member rotates about its longitudinal axis line, wherein a cable clamp is fixed to both of the proximal-side arm member and the distal-side arm member (cf. Japanese Unexamined Patent Application, Publication No. 2012-240123).

SUMMARY

A cable clamp according to a first aspect of the present disclosure includes: a base member fixed to a predetermined position of an arm of a robot; a rotation mechanism provided on the base member; and a clamp base rotatably supported by the base member using the rotation mechanism, wherein the clamp base includes a band winding portion which a fixation band is wound around, the fixation band is for fixing a cable to the clamp base.

DETAILED DESCRIPTION

Hereinafter, a cable clamp 50 according to a first embodiment of the present invention will be described with reference to the drawings.

Figure 1:
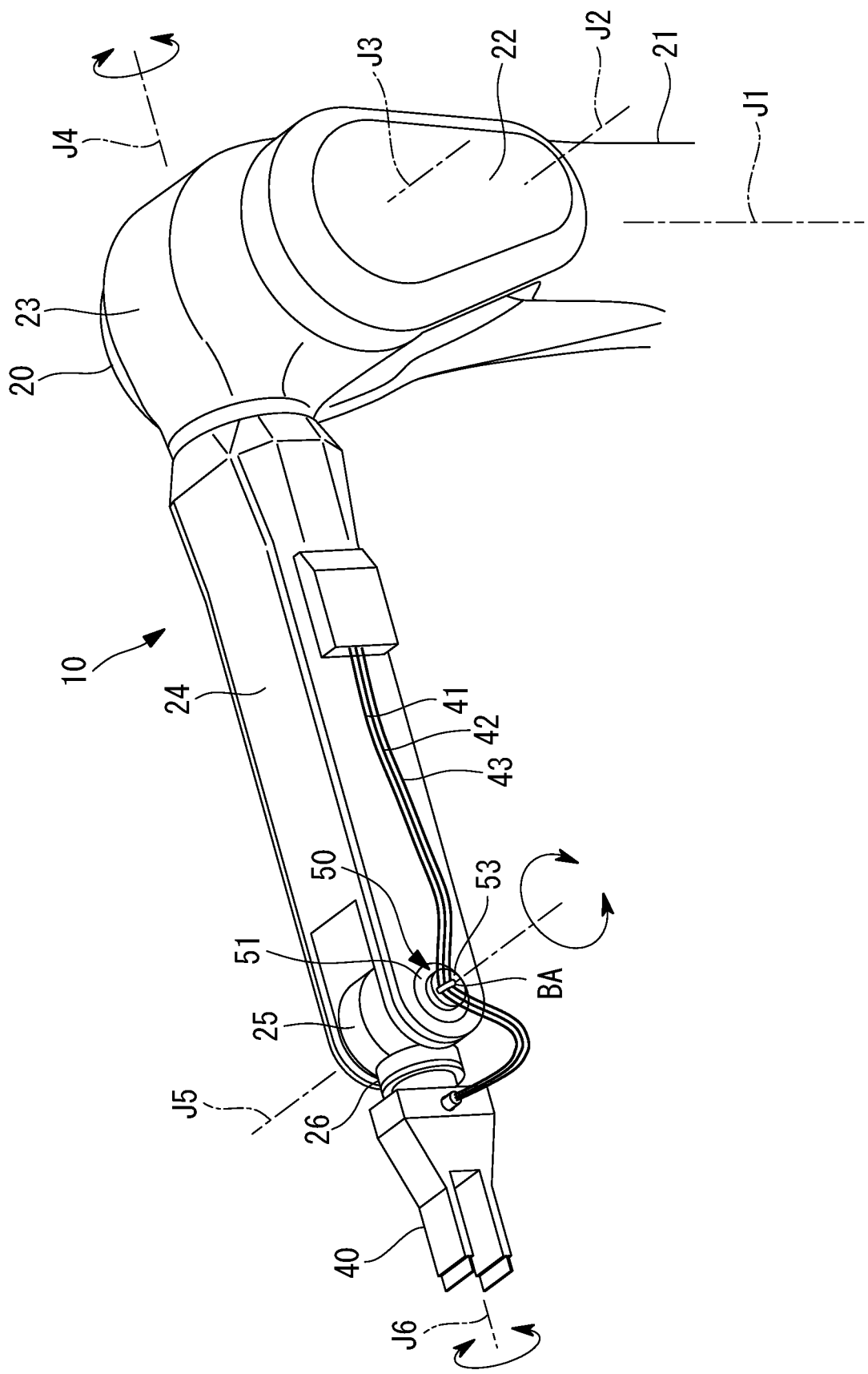
FIG. 1 is a schematic configurational view of a cable clamp and a robot according to a first embodiment of the present invention.

As illustrated in FIG. 1, the cable clamp 50 of this embodiment is attached to a robot 10 which is a 6-axis robot of a vertically articulated type. The robot 10 includes an arm 20, a controller 30, and a tool 40 attached to a distal end of the arm 20.

In this embodiment, the tool 40 is a tool that is normally used for a robot, such as a machining tool, an assembly tool, a measuring tool, various sensors, and a camera for a vision system. Examples of the machining tool include a drilling tool such as an electric drill, a threading tool having a tap at a distal end, an electric polishing tool, a painting tool such as a paint gun, and a welding tool such as a servo gun. Examples of the assembly tool include an electric screwdriver, and a tool for holding a pin and inserting the pin into a hole. Examples of the measuring tool include a film thickness gauge, an internal inspection unit using ultrasonic sound, a hardness measurement unit, a non-contact thermometer, and a closeup camera.

The arm 20 includes a plurality of arm members 21, 22, 23, 24, 25, and 26 and a plurality of joints. The arm 20 also includes a plurality of servo motors $21a$, $22a$, $23a$, $24a$, $25a$, and $26a$ that respectively drive the plurality of joints (see FIG. 4). As the servo motors $21a$, $22a$, $23a$, $24a$, $25a$, and $26a$, servo motors of various types such as rotary motors and direct drive motors may be used. Each of the servo motors $21a$, $22a$, $23a$, $24a$, $25a$, and $26a$ includes an operational position detector for detecting its operational position and operational speed. An example of the operational position detector is an encoder. Detected values of the operational position detector are transmitted to the controller 30.

In this embodiment, a proximal side of the arm member 21 is supported by a base portion that is not shown, and the arm member 21 is driven by the servo motor $21a$ to rotate about a J1 axis line with respect to the base portion. A proximal side of the arm member 22 is supported by a distal end side of the arm member 21, and the arm member 22 is driven by the servo motor $22a$ to rotate about a J2 axis line. A proximal side of the arm member 23 is supported by a distal end side of the arm member 22, and the arm member 23 is driven by the servo motor $23a$ to rotate about a J3 axis line.

Further, a proximal side of the arm member 24 is supported by a distal end side of the arm member 23, and the arm member 24 is driven by the servo motor $24a$ to rotate about a J4 axis line. A proximal side or a middle section of the arm member 25 is supported by a distal end side of the arm member 24, and the arm member 25 is driven by the servo motor $25a$ to rotate about a J5 axis line. A proximal side of the arm member 26 is supported by a distal end side of the arm member 25, and the arm member 26 is rotated by the servo motor $26a$ about a J6 axis line.

In this embodiment, the arm member 22, the arm member 23, and the arm member 25 are configured such that their one ends move along corresponding predetermined trajectories centering the respective proximal sides or the middle section. On the other hand, axis lines extending from the proximal sides to the distal end sides of the arm member 21, the arm member 24, and the arm member 26 are respectively along the J1 axis line, the J4 axis line, and the J6 axis line. In other words, each of the arm member 21, the arm member 24, and the arm member 26 rotates about its axis line that extends from the corresponding proximal side to the corresponding distal end side. In this embodiment, the movement of the arm members 21-26 respectively about the J1 axis line to the J6 axis line is referred to as rotation.

Figure 4:
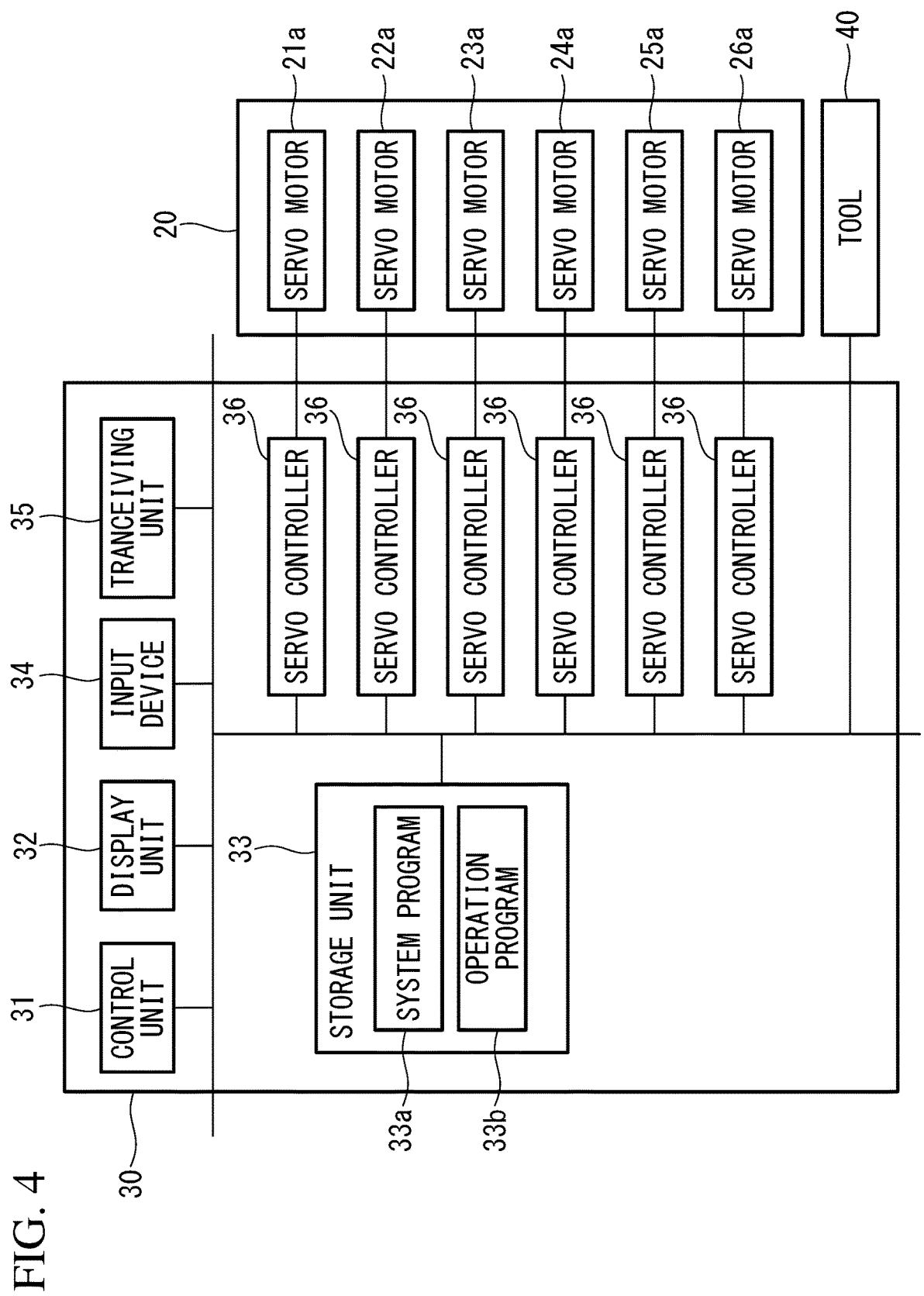
FIG. 4 is a block diagram of the robot according to the first embodiment.

As illustrated in FIG. 4, the controller 30 includes a control unit 31 having a processor or the like, a display unit 32, a non-volatile storage, a storage unit 33 having a ROM, a RAM, or the like, an input device 34 such as a keyboard, a touch-screen, or an operator's panel, a transceiving unit 35 for transmitting and receiving signals, and servo controllers 36 respectively connected to the servo motors 21a, 22a, 23a, 24a, 25a, and 26a. The input device 34 and the transceiving unit 35 serve as an input unit.

Further, the controller 30 is connected to the tool 40 via the communication cable 41 (FIG. 1 and FIG. 3), and the tool 40 is controlled by the controller 30.

In this embodiment, the controller 30 is a robot controller that controls the operation of the robot 10. However, the controller 30 may be a control device disposed within or outside the robot control device and provided with a configuration described above.

The storage unit 33 stores a system program 33a, and the system program 33a is responsible for a basic function of the controller 30. Further, the storage unit 33 stores an operation program 33b. Based on the operation program 33b, the control unit 31 transmits control commands for driving each of the servo motors 21a, 22a, 23a, 24a, 25a, and 26a and the tool 40 to the servo controllers 36 and the tool 40. With this, the arm 20 and the tool 40 of the robot 10 perform operations based on the operation program 33b.

Figure 2:
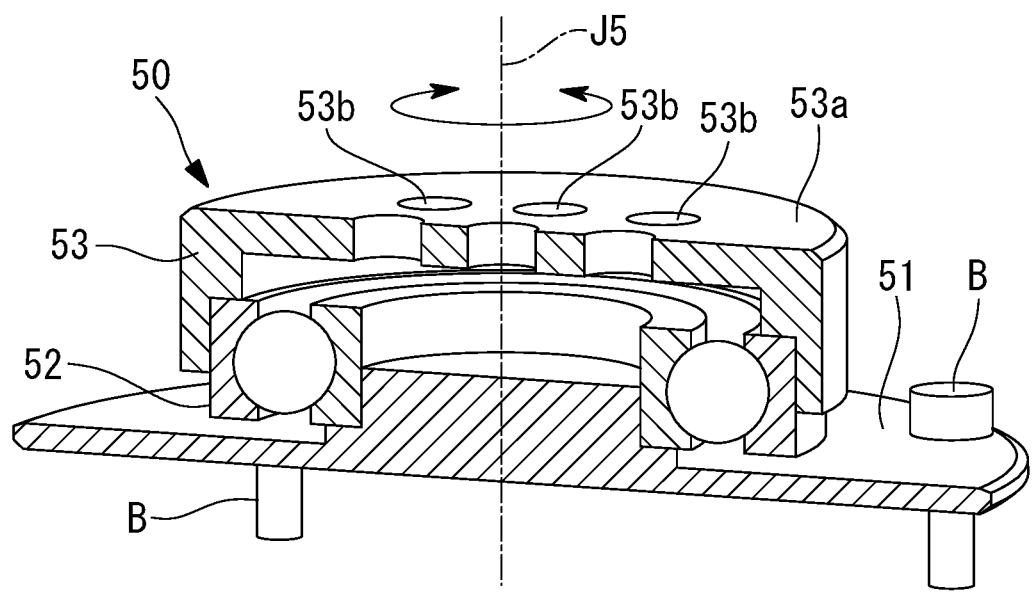
FIG. 2 is a partially cross-sectional perspective view of the cable clamp according to the first embodiment.

As shown in FIG. 2, the cable clamp 50 includes a base member 51 fixed on a predetermined position of the arm 20, a bearing 52 as a rotation mechanism provided on the base member 51, and a clamp base 53 rotatably supported by the base member 51 using the bearing 52.

The base member 51 is made of a metallic material, a plastic material, or the like. In this embodiment, the base member 51 is fixed to an outer periphery surface of the arm member 24 using a plurality of bolts B. Here, the base member 51 may be fixed to the outer periphery surface of the arm member 24 by fastening members other than the bolts B, or by means of welding In this embodiment, one of an inner ring and an outer ring of the bearing 52 is fixed to the base member 51, and the other of the inner ring and the outer ring of the bearing 52 is fixed to the clamp base 53. With this, the clamp base 53 is supported by the base member 51, and the clamp base 53 is rotatable about a rotation axis line of the bearing 52 with respect to the base member 51.

In this embodiment, the rotation axis line of the bearing 52 is parallel with the J5 axis line, and the rotation axis line of the bearing 52 is located near the J5 axis line or at a position matching the J5 axis line.

In this embodiment, the bearing 52 is a rotational bearing such as a ball bearing. As the rotation mechanism, a plain bearing may also be used in place of the bearing 52. Further, a circle portion or a circular portion as a part of the base member 51 and a part of the clamp base 53 may be connected directly without using the bearing 52, so that the clamp base 53 rotates about the rotation axis line with respect to the base member 51. In this case, the rotation mechanism is constituted by the part of the clamp base 53 and the part of the base member 51.

Figure 3:
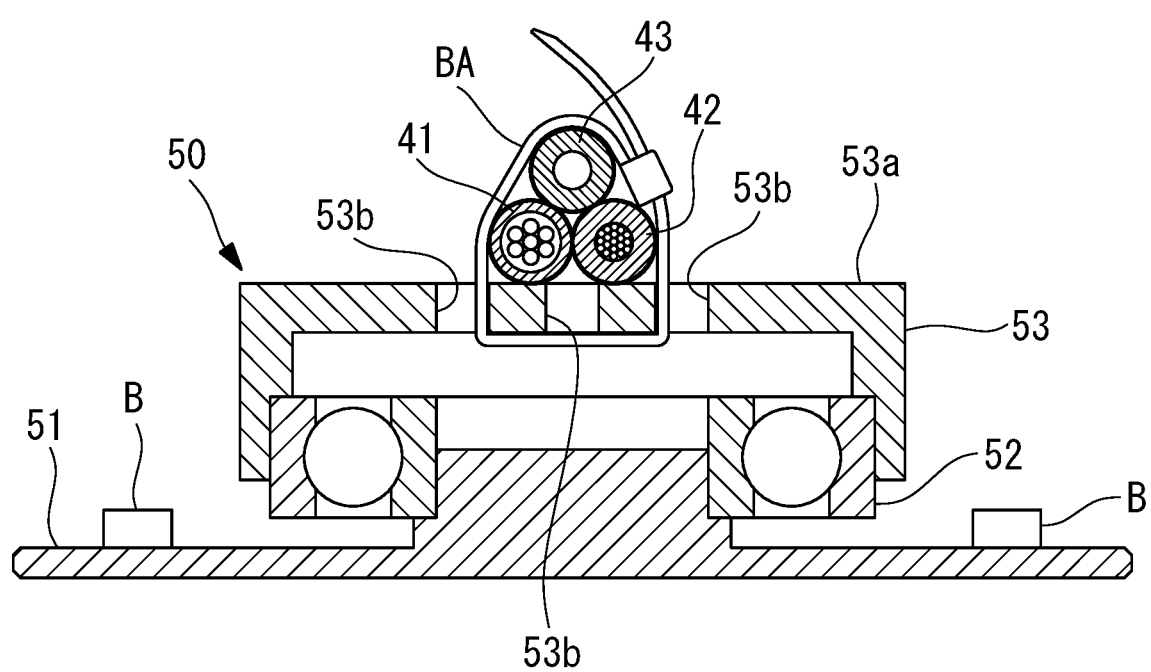
FIG. 3 is a diagram illustrating a use state of the cable clamp according to the first embodiment.

The clamp base 53 is made of a metallic material, plastic material, or the like. As illustrated in FIG. 3, the clamp base 53 includes an attachment surface 53a for attachment of the communication cable 41, an electrical power cable 42 for supplying electrical power to the tool 40, and a power source supply cable 43 for supplying power source such as air and oil to the tool 40, and the like. In this embodiment, a surface on one side of the clamp base 53 in a through-thickness direction is the attachment surface 53a.

As illustrated in FIG. 3, the clamp base 53 is provided with a plurality of attachment holes 53b. The attachment holes 53b penetrate the clamp base 53 in its through-thickness direction. As will be described later, the plurality of attachment holes 53b serve as a band winding portion in order to have a fixation band BA be wound around. The fixation band BA may be of any type as long as the band is able to fix the communication cable 41, the electrical power cable 42, the power source supply cable 43, and the like to the clamp base 53. The fixation band BA is made of a plastic material, a metallic material, or the like, and the fixation band BA is a known banding band, for example.

As the fixation band BA, it is also possible to employ a string, a belt having hook-and-loop fasteners on both ends, a wire, a rubber belt, a nylon belt, or a different member similar to these. In this case, too, the fixation band BA may fix the communication cable 41, the electrical power cable 42, the power source supply cable 43, and the like to the clamp base 53.

Next, a case in which the cable clamp 50 of this embodiment is used is described.

First, the communication cable 41, the electrical power cable 42, and the power source supply cable 43 are configured such that their one ends are connected to the tool 40, and the other ends are inserted through an opening provided in the arm member 24. At this time, as illustrated in FIG. 3, middle sections of the communication cable 41, the electrical power cable 42, and the power source supply cable 43 are fixed to the clamp base 53 using the fixation band BA.

For example, a user of the robot 10 inserts one end of the fixation band BA through one of the attachment holes 53b and positions the one end on the other surface of the clamp base 53 in its through-thickness direction, and then inserts the one end of the fixation band BA into different one of the attachment holes 53b. With this, the fixation band BA is wound around the clamp base 53. Then, the user places the middle sections of the communication cable 41, the electrical power cable 42, and the power source supply cable 43 on the attachment surface 53a of the clamp base 53, and couples the one end and the other end of the fixation band BA in a state in which the cables 41, 42, and 43 are positioned between the one end side and the other end side of the fixation band BA. Further, as illustrated in FIG. 3, the user fixes the middle sections of the communication cable 41, the electrical power cable 42, and the power source supply cable 43 to the clamp base 53, by pulling the one end or the other end of the fixation band BA.

When the robot 10 is operated, if the arm member 25 of the robot 10 rotates about the J5 axis line with respect to the arm member 24, the one ends of the cables 41, 42, and 43 move along with the rotation. Here, the clamp base 53 of the cable clamp 50 is rotatable by the bearing 52. Therefore, the clamp base 53 rotates to a rotational position according to the movement of the one ends of the cables 41, 42, and 43. As the configuration described above is provided, the extra lengths of the cables 41, 42, and 43 between the cable clamp 50 and the tool 40 may be shortened, as compared to a case in which the clamp base 53 does not rotate by the bearing 52. Further, as compared to the case in which the clamp base 53 does not rotate by the bearing 52, it is possible to reduce damages applied to the cables 41, 42, and 43 between the cable clamp 50 and the tool 40.

As described above, in this embodiment, the cables 41, 42, and 43 are fixed to the clamp base 53 by the fixation band BA. Further, the clamp base 53 to which the cables 41, 42, and 43 are fixed is rotatable with respect to the base member 51 by the bearing 52. In this embodiment, the base member 51 is fixed to the arm member 24, and the cables 41, 42, and 43 are connected to the tool 40 that is provided at a side of the arm member 25 on the further distal side of the arm member 24. Then, when the arm member 25 is operated, the clamp base 53 rotates according to the movement of the arm member 25. As the clamp base 53 follows the movement of the arm member 25 in this manner, it is possible to shorten the extra lengths of the cables 41, 42, and 43 by an amount of the movement, as well as to reduce damages applied to the cables 41, 42, and 43.

Further, in this embodiment, the base member 51 is fixed to the arm member 24, and the rotation axis line of the clamp base 53 by the bearing 52 is parallel with the J5 axis line that is the rotation axis line of the arm member 25 on the further distal side of and next to the arm member 24 to which the base member 51 is fixed.

When the arm member 25 moves about the J5 axis line, the cables 41, 42, and 43 tend to move around the J5 axis line as well. In this embodiment, as the J5 axis line is parallel with the rotation axis line of the bearing 52, the clamp base 53 easily rotates according to the movement of the cables 41, 42, and 43.

Further, in this embodiment, the base member 51 is fixed to the arm member 24, and the rotation axis line of the clamp base 53 by the bearing 52 is not parallel with the J4 axis line that is a rotation axis line of the arm member 24 to which the base member 51 is fixed.

The J5 axis line that is the rotation axis line of the arm member 25 on the further distal side of and next to the arm member 24 to which the base member 51 is fixed extends in a direction different by 90° from the J4 axis line that is the rotation axis line of the arm member 24 to which the base member 51 is fixed. Further, when the arm member 25 moves about the J5 axis line, the cables 41, 42, and 43 tend to move around the J5 axis line as well. In this embodiment, as the rotation axis line of the bearing 52 is not parallel with the J4 axis line that is the rotation axis line of the arm member 24 to which the base member 51 is fixed, the clamp base 53 easily rotates according to the movement of the cables 41, 42, and 43.

Further, in this embodiment, the base member 51 is fixed to the arm member 24 that is the third arm member from the distal end out of the plurality of arm members 21-26.

While the base member 51 of the cable clamp 50 is fixed to the distal side of the arm 20 in this manner, this embodiment is advantageous in order to reduce the weight of the arm 20 on the distal side, as the cable clamp 50 has a simple configuration. In this embodiment, the arm members on a most distal side to the third distal side out of the plurality of arm members 21-26 are the distal side of the arm 20.

It should be noted that the rotation axis line of the bearing 52 of the cable clamp 50 may be located at a position different from the J5 axis line. For example, the base member 51 of the cable clamp 50 may be fixed at a middle position between the opening in the arm member 24 and the J5 axis line. Such a configuration may also provide the same effect as described above.

It should be noted that the base member 51 of the cable clamp 50 may be fixed to the arm member 23, the arm member 25, or the like. Such a configuration may also provide the same effect as described above.

Further, one or more of the communication cable 41, the electrical power cable 42, and the power source supply cable 43 may be fixed to the cable clamp 50, or a different cable may be fixed to the cable clamp 50.

The cable clamp 50 according to a second embodiment of the present invention will be described with reference to the drawings.

In the second embodiment, components which are similar to or the same as those in the first embodiment are denoted by the same reference numbers, and descriptions for configurations, and processes that are similar to or the same as those in the first embodiment shall be omitted. Further, the second embodiment may be modified similarly to the first embodiment. For example, it is possible to make various changes such as changing the type of the tool 40 to a different tool, and changing the type of the rotation mechanism of the cable clamp 50.

According to the second embodiment, the cable clamp 50 is attached to a robot 60 of a horizontal articulated type. The robot 60 includes an arm 70, a controller 80, and the tool 40 attached to a distal end of the arm 70.

The arm 70 includes a plurality of arm members 71, 72, and 73 and a plurality of joints. The arm 70 also includes a plurality of servo motors 71a, 72a, 73a, and 74a that respectively drive the plurality of joints (see FIG. 8). Examples of the servo motors 71a, 72a, 73a, and 74a that may be used include servo motors of various types such as rotary motors and direct drive motors. Each of the servo motors 71a, 72a, 73a, and 74a includes an operational position detector for detecting its operational position and operational speed. One example of the operational position detector is an encoder. Detected values of the operational position detector are transmitted to the controller 80.

In this embodiment, a proximal side of the arm member 71 is supported by a base portion 70a, and the arm member 71 is rotated by the servo motor 71a with respect to the base portion 70a about a first axis line 71b extending in a vertical direction. A proximal side of the arm member 72 is supported by a distal end side of the arm member 71, and the arm member 72 is rotated by the servo motor 72a about a second axis line 72b extending in the vertical direction. The arm member 73 is a cylindrical member extending in the vertical direction. The arm member 73 is supported by a distal end side of the arm member 72, and the arm member 73 is moved by the servo motor 73a along a third axis line 73b extending in the vertical direction. Further, a part or all of the arm member 73 is rotated by the servo motor 74a about the third axis line 73b. The part of the arm member 73 is a lower end portion of the arm member 73, for example. In this case, the arm member 73 includes, at its lower end portion, a rotary member that rotates about the third axis line 73b.

In this embodiment, the arm member 71 and the arm member 72 are configured such that their one ends move along corresponding predetermined trajectories centering the respective proximal sides. On the other hand, the part or all of the arm member 73 rotates about the third axis line 73b as its central axis line. In this embodiment, the movement of the arm members 71-73 respectively about the first to the third axis line 71b-73b is referred to as rotation.

Figure 7:
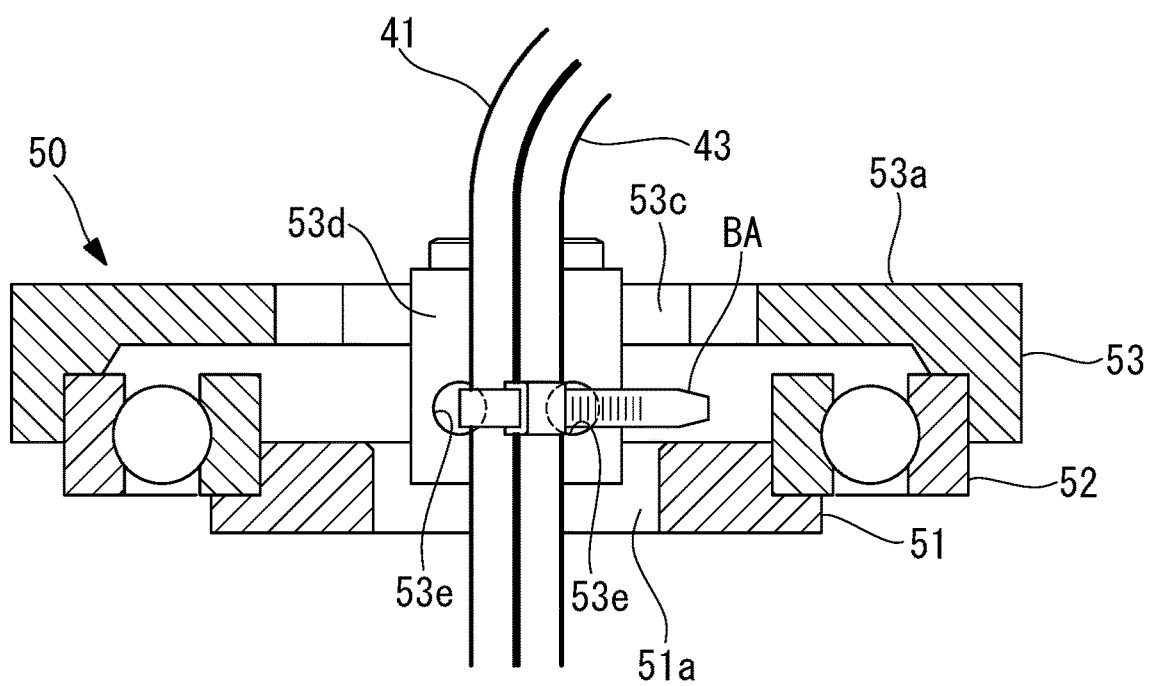
FIG. 7 is a diagram illustrating a use state of the cable clamp according to the second embodiment.
Figure 8:
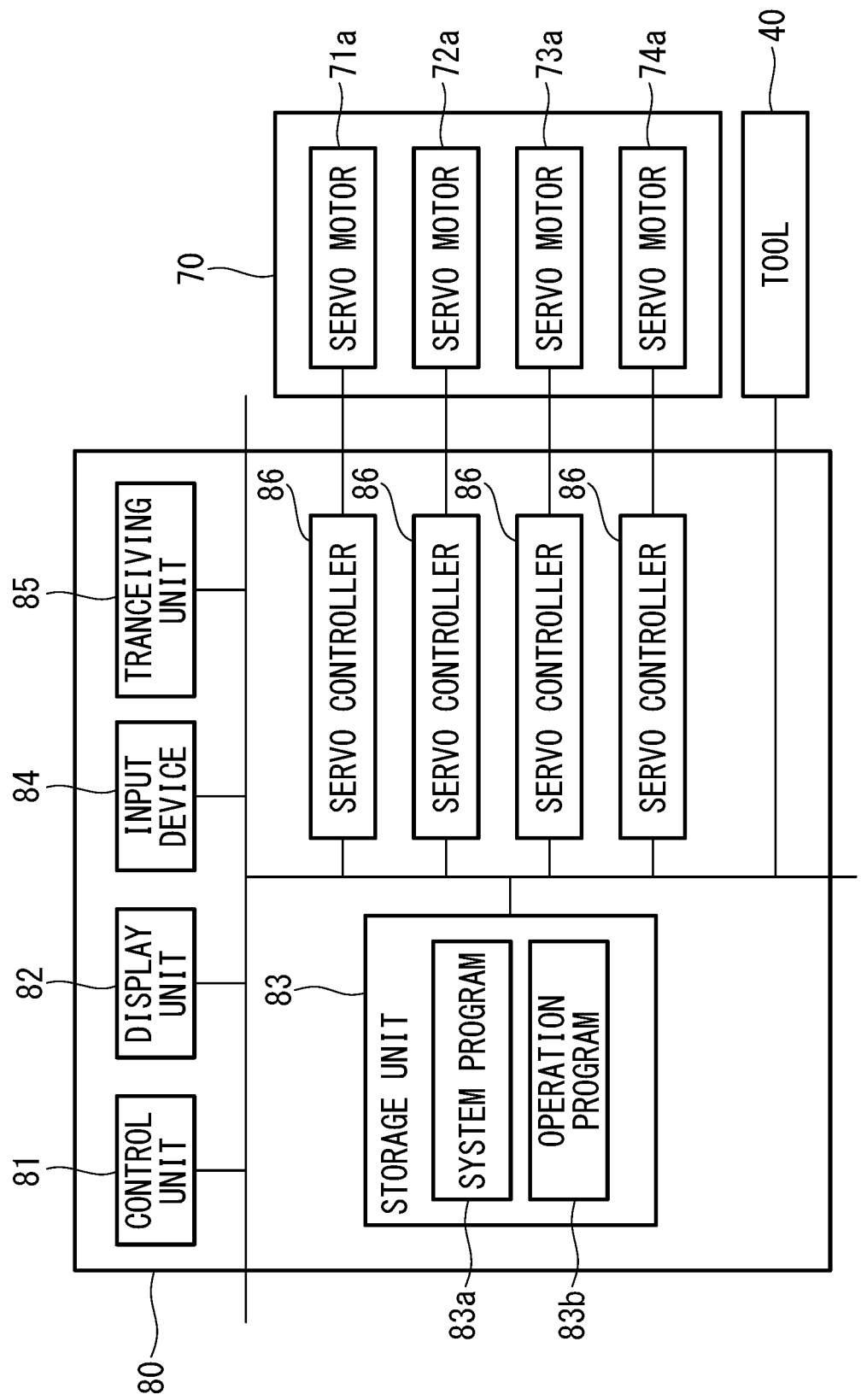
FIG. 8 is a block diagram of the robot according to the second embodiment.

As illustrated in FIG. 8, the controller 80 is equivalent to the controller 30 according to the first embodiment. The controller 80 is connected to the tool 40 via the communication cable 41 (FIG. 5 and FIG. 7), and the tool 40 is controlled by the controller 80. In the second embodiment, the communication cable 41 includes an electrical power line.

The cable clamp 50 includes the base member 51, the bearing 52, and the clamp base 53, which are similar to or the same as the first embodiment.

In the second embodiment, the base member 51 is fixed to an upper end surface of the arm member 73 using the plurality of bolts B. Further, the rotation axis line of the bearing 52 is parallel with the third axis line 73b, and the rotation axis line of the bearing 52 is located near the third axis line 73b or at a position matching the third axis line 73b.

Figure 5:
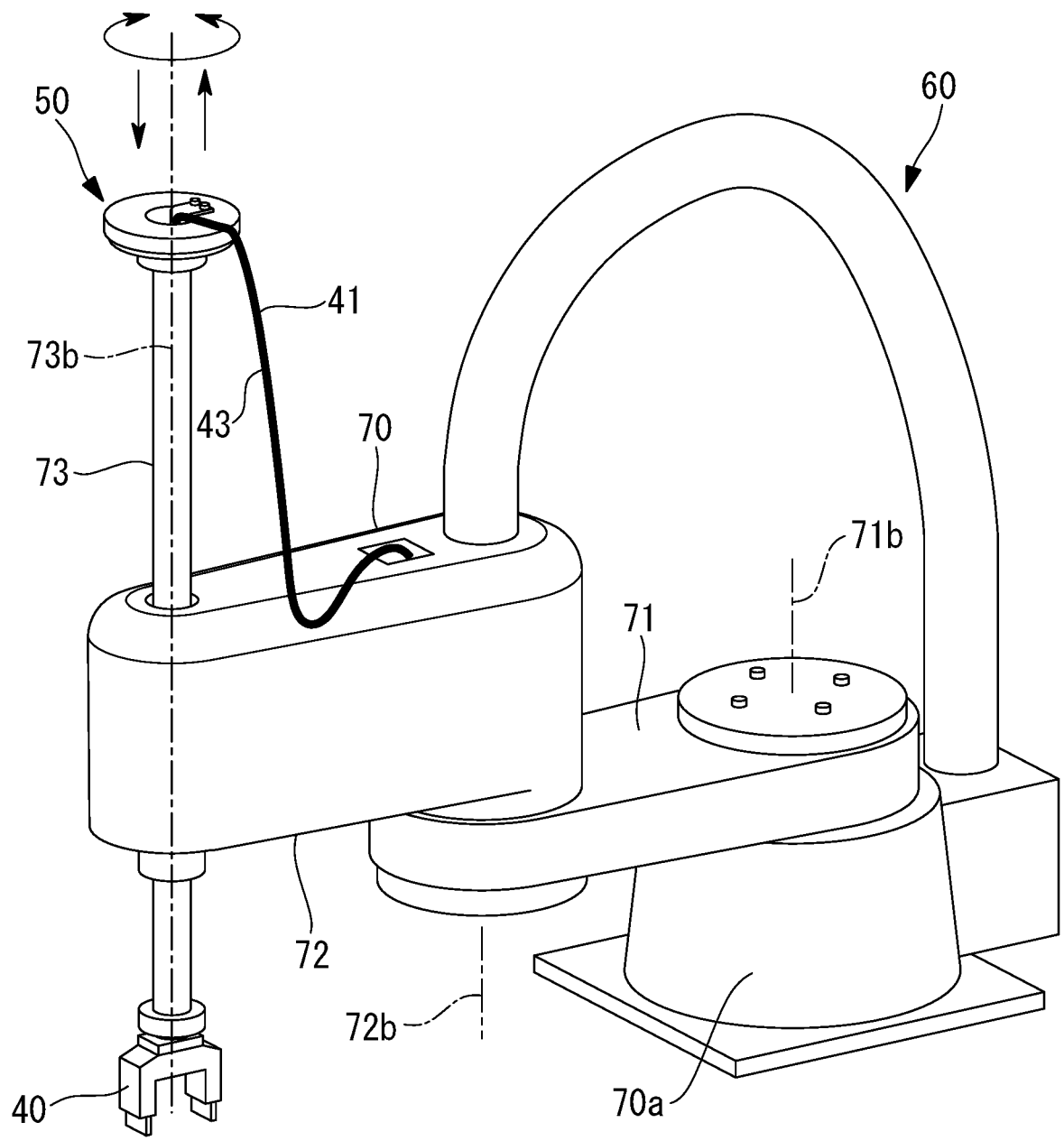
FIG. 5 is a schematic configurational view of a cable clamp and a robot according to a second embodiment of the present invention.
Figure 6:
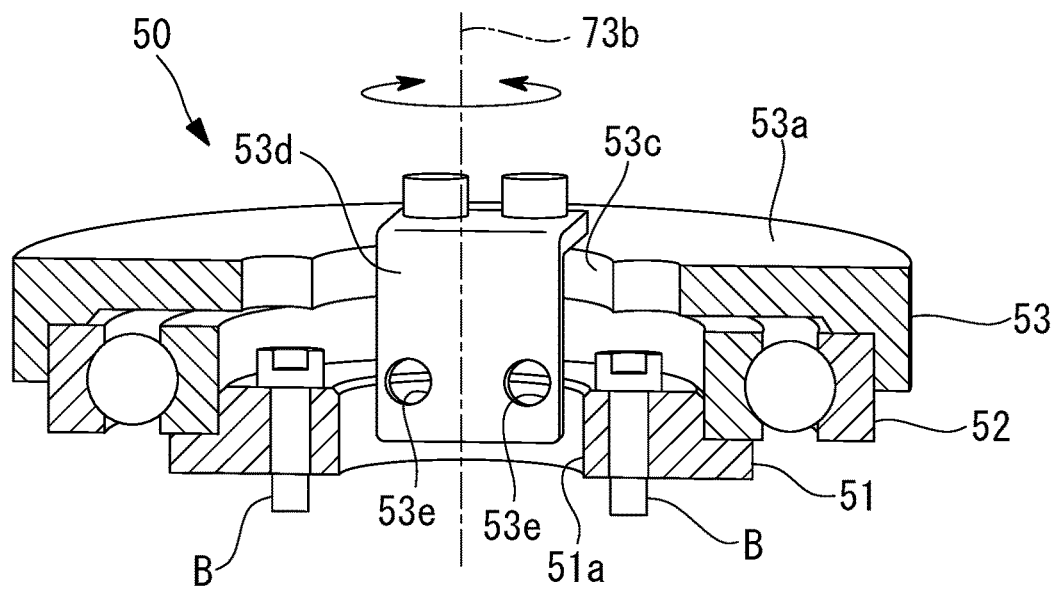
FIG. 6 is a partially cross-sectional perspective view of the cable clamp according to the second embodiment.

In the second embodiment, as illustrated in FIG. 5 and FIG. 6, in a central portion of the base member 51, there is a through hole 51a that penetrates the base member 51 in the vertical direction, and the clamp base 53 is provided with a through hole 53c that penetrates the clamp base 53 in the vertical direction. The through hole 53c is provided at a position corresponding to the through hole 51a. Further, the through hole 51a is provided at a position corresponding to a space within the arm member 73.

To the clamp base 53, a cable fixation member 53d made of a plate-shaped member is fixed. The cable fixation member 53d is fixed by a bolt or by welding. The cable fixation member 53d is provided with a plurality of attachment holes 53e, and each of the attachment holes 53e penetrates the cable fixation member 53d in its through-thickness direction. As will be described later, the plurality of attachment holes 53e serve as a band winding portion in order to have the fixation band BA be wound around. Members fixed to the clamp base 53 such as the cable fixation member 53d can be considered to be a part of the clamp base 53. In the second embodiment, the cables 41 and 43 are pressed against one surface of the cable fixation member 53d in its through-thickness direction.

Next, a case in which the cable clamp 50 of the second embodiment is used is described.

First, the communication cable 41 and the power source supply cable 43 are configured such that their one ends are connected to the tool 40, and the other ends is inserted through an opening provided in the arm member 72. At this time, as illustrated in FIG. 7, middle sections of the communication cable 41 and the power source supply cable 43 are fixed to the clamp base 53 using the fixation band BA.

For example, the user of the robot 60 inserts one end of the fixation band BA through one of the attachment holes 53e and positions the one end on the other surface of the cable fixation member 53d in its through-thickness direction, and then inserts the one end of the fixation band BA into different one of the attachment holes 53e. With this, the fixation band BA is wound around the cable fixation member 53d of the clamp base 53. Subsequently, the user places the middle sections of the communication cable 41 and the power source supply cable 43 on the attachment surface 53a of the clamp base 53 and on the cable fixation member 53d. Then, the user couples the one end and the other end of the fixation band BA in a state in which the cables 41 and 43 are positioned between the one end side and the other end side of the fixation band BA. Further, as illustrated in FIG. 7, the user fixes the middle sections of the communication cable 41 and the power source supply cable 43 to the clamp base 53, by pulling the one end or the other end of the fixation band BA.

When the robot 60 is operated, the part or all of the arm member 73 rotates about the third axis line 73b with respect to the arm member 72. Here, the clamp base 53 of the cable clamp 50 is rotatable by the bearing 52. Therefore, the clamp base 53 does not rotate along with the arm member 73, and the clamp base 53 rotates to a rotational position according to the twisting of the one ends of the cables 41 and 43. As the configuration described above is provided, the extra lengths of the cables 41 and 43 extending from the cable clamp 50 to the arm member 72 may be shortened, as compared to a case in which the clamp base 53 does not rotate by the bearing 52. Further, as compared to the case in which the clamp base 53 does not rotate by the bearing 52, it is possible to reduce damages applied to the cables 41 and 43.

As described above, in the second embodiment, the cables 41 and 43 are fixed to the clamp base 53 by the fixation band BA. Further, the clamp base 53 to which the cables 41 and 43 are fixed is rotatable with respect to the base member 51 by the bearing 52. In this embodiment, the base member 51 is fixed to the arm member 73, and the cables 41 and 43 are connected to the tool 40 that is provided at a distal end side of the arm member 73. Then, when the arm member 73 is operated, the clamp base 53 rotates according to the movement of the arm member 73. As the clamp base 53 follows the movement of the arm member 73 in this manner, it is possible to shorten the extra lengths of the cables 41 and 43 by an amount of the movement, as well as to reduce damages applied to the cables 41 and 43.

Further, according to the second embodiment, the part or all of the cylindrical arm member 73 rotates about the third axis line 73b that is its central axis line. Moreover, the base member 51 is fixed to the upper end of the arm member 73, and the one ends of the cables 41 and 43 fixed to the clamp base 53 are disposed in the space within the cylindrical arm member 73.

The cylindrical arm member 73 rotates about the third axis line 73b with respect to the arm member 72 on the proximal side of the arm member 73. Therefore, if the cables 41 and 43 are provided on the side of the outer periphery surface of the cylindrical arm member 73, the cables 41 and 43 are wound around the arm member 73 due to the rotation of the part or all of the arm member 73. By contrast, according to the second embodiment, the one ends of the cables 41 and 43 are disposed in the space within the cylindrical arm member 73, and the clamp base 53 rotates when the arm member 73 rotates. Therefore, it is possible to shorten the extra lengths of the cables 41 and 43, as well as to effectively reduce damages applied to the cables 41 and 43.

Further, in the second embodiment, the base member 51 is fixed to the arm member 73 on a most distal side out of the plurality of arm members 71-73.

While the base member 51 of the cable clamp 50 is fixed to the distal side of the arm 70 in this manner, this embodiment is advantageous in order to reduce the weight of the arm 70 on the distal side, as the cable clamp 50 has a simple configuration. In the second embodiment, the arm members on the most distal side to a second distal side out of the plurality of arm members 71-73 are the distal side of the arm 70.

It should be noted that the cable clamp 50 may be attached to the arm members 71 and 72. For example, the base member 51 of the cable clamp 50 may be attached to a lower surface of the arm member 72. In this case, the cables 41 and 43 may extend directly from the opening of the arm member 72 to the tool 40 without passing through the arm member 73. By attaching the middle sections of the cables 41 and 43 configured in this manner to the clamp base 53 of the cable clamp 50, it is possible to provide effects such as reduction of the extra length and reduction of damages to the cables 41 and 43.

Further, the tool 40 may be a sensor, a camera, or the like attached to a lower surface of the arm member 72 or the arm member 71. In this case, similarly, by attaching the cable clamp 50 to the arm members 71, 72, and attaching the middle sections of the cables 41 and 43 to the clamp base 53 of the cable clamp 50, it is possible to provide effects such as reduction of the extra length and reduction of damages to the cables 41 and 43.

Here, one or more of the communication cable 41, the electrical power cable 42, and the power source supply cable 43 may be fixed to the cable clamp 50, or a different cable may be fixed to the cable clamp 50.

It should be noted that in the various embodiments described above, the attachment surface 53a may not be vertical to the rotation axis line of the bearing 52. For example, the attachment surface 53a may be inclined by an angle of 45° or smaller to a surface vertical to the rotation axis line of the bearing 52. Further, the attachment surface 53a may be a surface including a curved surface or concavity and convexity.

Further, in the various embodiments described above, the cables 41, 42, and 43 may be fixed to the clamp base 53 by the fixation band BA wound around a portion such as a projection or a recess provided on the clamp base 53.

Further, in the various embodiments described above, the other ends of the cables 41, 42, and 43 may be connected to various devices without passing through the robot 10 or 60.

Further, in the various embodiments described above, the cable clamp 50 may be fixed in the internal space of the robot 10 or 60. In this case, when the cables 41, 42, and 43 are fixed to the cable clamp 50, at least a part of the cables 41, 42, and 43 near the cable clamp 50 is placed in the space within the robot 10 or 60.

Figure 9:
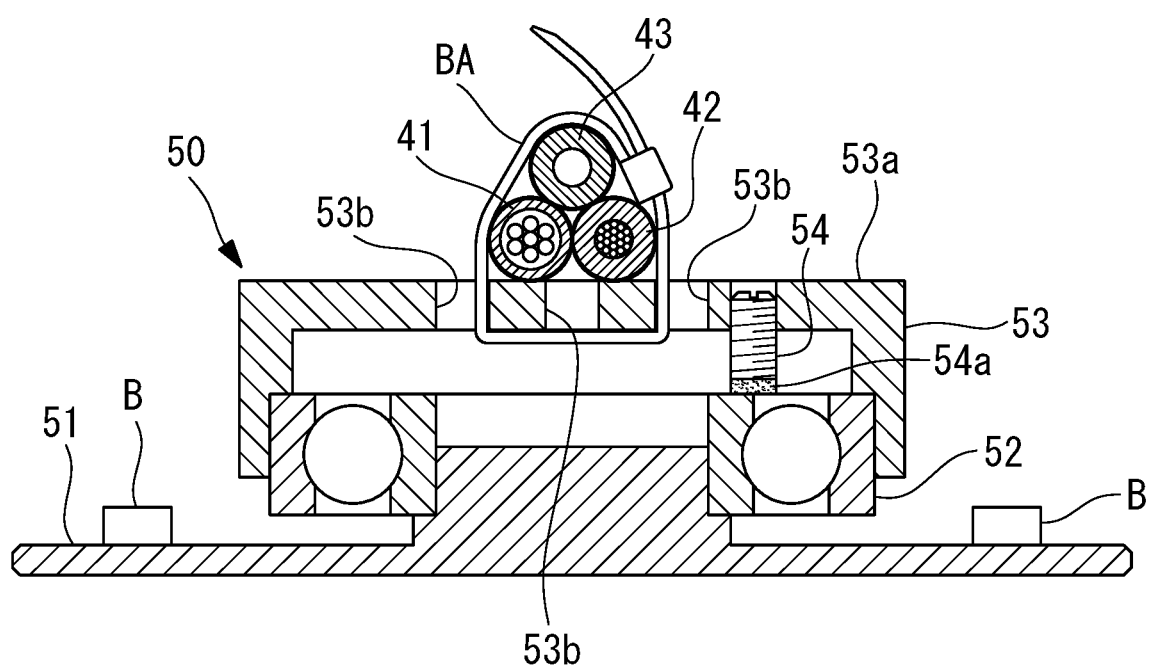
FIG. 9 is a cross-sectional view of a modification of a cable clamp according to the first embodiment.

Further, in the various embodiments described above, the cable clamp 50 may include a friction adjustment mechanism. For example, as illustrated in FIG. 9, the friction adjustment mechanism may be realized using a screw member 54 that is inserted through the clamp base 53 and a frictional contact member 54a provided at a distal end of the screw member 54. In this case, when the screw member 54 is fastened, the frictional contact member 54a at the distal end of the screw member 54 is brought into contact with an inner ring of the bearing 52, the base member 51, and the like, and a frictional force (resisting force) to the rotation of the clamp base 53 is generated by the contact. In other words, the friction adjustment mechanism is able to adjust the frictional force (resisting force) between the base member 51 and the clamp base 53. By employing this configuration, it is possible to suppress unintentional rotation of the clamp base 53 when the robot 10 or 60 is operated at high speed.

Further, it is possible to provide a biasing member for biasing the clamp base 53 to a predetermined rotational position with respect to the base member 51. By employing this configuration, positioning of the cables 41, 42, and 43 may often be facilitated, as compared to a case in which the biasing member is not provided.

It should be noted that the cable clamp 50 may be attached to a parallel link robot in place of the robot 10 or 60. The parallel link robot includes a plurality of arms respectively having a plurality of arm members, and wrist members supported by the plurality of arms, for example. Further, the wrist member includes a fixed-side member supported by distal ends of plurality of arms, and a rotary member that rotates with respect to the fixed-side member. The cable clamp 50 may be attached to any of the plurality of arm members that constitute the plurality of arms, or to the fixed-side member. Such a configuration may also provide the same effects as described above.

From the above-described embodiments, the following aspects of the present disclosure are derived.

A cable clamp according to a first aspect of the present disclosure includes: a base member fixed to a predetermined position of an arm of a robot; a rotation mechanism provided on the base member; and a clamp base rotatably supported by the base member using the rotation mechanism, wherein the clamp base includes a band winding portion which a fixation band is wound around, the fixation band is for fixing a cable to the clamp base.

According to this aspect, the cable is fixed to the clamp base by the fixation band. Further, the clamp base to which the cable is fixed is rotatable with respect to the base member by the rotation mechanism. For example, the base member is fixed to one arm member, and the cable is connected to another arm member that is on the distal side of the one arm member. When the arm member on the distal side is operated, the clamp base rotates according to the movement of the arm member on the distal side. As the clamp base follows the movement of the arm member in this manner, it is possible to shorten the extra length of the cable by an amount of the movement.

In this aspect, preferably, the arm of the robot includes a plurality of arm members, the base member is fixed to one of the plurality of arm members, and a rotation axis line of the clamp base by means of the rotation mechanism is parallel with a rotation axis line of different one of the arm members disposed on a distal side of and next to the one of the arm members to which the base member is fixed.

When the arm member on the distal side moves about its rotation axis line, the cable tends to move around the rotation axis line as well. In this aspect, as this rotation axis line is parallel with the rotation axis line of the rotation mechanism, the clamp base easily rotates according to the movement of the cable.

In this aspect, preferably, the arm of the robot includes a plurality of arm members, the base member is fixed to one of the plurality of arm members, and a rotation axis line of the clamp base by means of the rotation mechanism is not parallel with a rotation axis line of the one of the arm members to which the base member is fixed.

The rotation axis line of the arm member that is on the distal side of and next to the one of the arm members to which the base member is fixed often extends in a direction different by 90° from the rotation axis line of the one of the arm members to which the base member is fixed. Further, when the arm member on the distal side moves about its rotation axis line, the cable tend to move around the rotation axis line as well. In this aspect, as the rotation axis line of the rotation mechanism is not parallel with the rotation axis line of the one of the arm members to which the base member is fixed, the clamp base easily rotates according to the movement of the cable.

In this aspect, preferably, the arm of the robot includes a plurality of arm members, one of the plurality of arm members has a cylindrical shape elongated vertically, the cylindrical arm member is configured to rotate about a central axis line thereof, the base member is fixed to an upper end of the cylindrical arm member, and one end side of a cable fixed to the clamp base is disposed in a space within the cylindrical arm member.

The cylindrical arm member rotates about its central axis line with respect to the arm member on the proximal side. Therefore, when the cable is provided on the side of the outer periphery surface of the cylindrical arm member, the cable is wound around the cylindrical arm member due to the rotation of the cylindrical arm member. In contrast, according to this aspect, the one end side of the cable is disposed in the space within the cylindrical arm member, and the clamp base rotates as the cylindrical arm member rotates. Therefore, it is possible to shorten the extra length of the cable.

In this aspect, preferably, the arm of the robot includes a plurality of arm members, one of the plurality of arm members has a cylindrical shape elongated vertically, a rotary member configured to rotate about a central axis line of the cylindrical arm member is attached to a lower end portion of the cylindrical arm member, the base member is fixed to an upper end of the cylindrical arm member, and one end side of a cable fixed to the clamp base is disposed in a space within the cylindrical arm member.

The rotary member at the lower end of the cylindrical arm member rotates with respect to the cylindrical arm member. Therefore, if the one end side of the cable is connected to a the rotary member side, the cable is wound around the cylindrical arm member due to the rotation of the rotary member. In contrast, according to this aspect, the one end side of the cable is disposed in the space within the cylindrical arm member, and the clamp base rotates as the rotary member rotates. Therefore, it is possible to shorten the extra length of the cable.

In this aspect, preferably, the arm of the robot includes a plurality of arm members, and the base member is fixed to one of a most distal side, a second distal side, and a third distal side of the plurality of arm members.

While the base member of the cable clamp is fixed to a distal side of the arm in this manner, this aspect is advantageous in order to reduce the weight of the arm on the distal side, as the cable clamp has a simple configuration.

In this aspect, preferably, there is provided a friction adjustment mechanism configured to adjust a frictional force for resisting against rotation of the clamp base by the rotation mechanism.

By employing this configuration, it is possible to suppress unintentional rotation of the clamp base when the robot is operated at high speed.

A robot according to a second aspect of the present disclosure is a robot including the cable clamp as described above.

According to the aforementioned aspects, it is possible to reduce the extra length of the cable.

REFERENCE SIGNS LIST

10 Robot
20 Arm
21-26 Arm members
30 Controller
40 Tool
41 Communication cable
42 Electrical power cable
43 Power source supply cable
50 Cable clamp
51 Base member
52 Bearing
53 Clamp base
53a Attachment surface
53b Attachment hole
53c Through hole
53d Cable fixation member
53e Attachment hole
60 Robot
70 Arm
71-73 Arm members
80 Controller
BA Fixation band

The invention claimed is:

1. A cable clamp comprising:
a base member fixed to a predetermined position of an arm of a robot;
a rotation mechanism provided on the base member; and
a clamp base rotatably supported by the base member using the rotation mechanism, wherein the clamp base is rotatable around a predetermined rotation axis line,
wherein the clamp base includes a plurality of holes, each of which penetrates the clamp base along the predetermined rotation axis line and into which a fixation band that is wound around a cable is inserted for fixing the cable to the clamp base.

2. The cable clamp according to claim 1, wherein
the arm of the robot includes a plurality of arm members,
the base member is fixed to one of the plurality of arm members, and
the predetermined rotation axis line of the clamp base by means of the rotation mechanism is parallel with a rotation axis line of different one of the arm members disposed on a distal side of and next to the one of the arm members to which the base member is fixed.

3. The cable clamp according to claim 1, wherein
the arm of the robot includes a plurality of arm members,
the base member is fixed to one of the plurality of arm members, and
the predetermined rotation axis line of the clamp base by means of the rotation mechanism is not parallel with a rotation axis line of the one of the arm members to which the base member is fixed.

4. The cable clamp according to claim 1, wherein
the arm of the robot includes a plurality of arm members, and
the base member is fixed to one of a most distal side, a second distal side, and a third distal side of the plurality of arm members.

5. The cable clamp according to claim 1, comprising:
a friction adjustment mechanism configured to adjust a frictional force for resisting against rotation of the clamp base by the rotation mechanism.

6. A robot comprising the cable clamp according to claim 1.

7. A cable clamp comprising:
a base member fixed to a predetermined position of an arm of a robot;
a rotation mechanism provided on the base member; and
a clamp base rotatably supported by the base member using the rotation mechanism, wherein
the clamp base includes a band winding portion which a fixation band is wound around, and the fixation band is for fixing a cable to the clamp base, wherein
the arm of the robot includes a plurality of arm members,
one of the plurality of arm members has a cylindrical shape elongated vertically, the cylindrical arm member is configured to rotate about a central axis line thereof,
the base member is fixed to an upper end of the cylindrical arm member, and one end side of a cable fixed to the clamp base is disposed in a space within the cylindrical arm member.

8. A cable clamp comprising:

a base member fixed to a predetermined position of an arm of a robot;

a rotation mechanism provided on the base member; and a clamp base rotatably supported by the base member using the rotation mechanism, wherein the clamp base includes a band winding portion which a fixation band is wound around, and the fixation band is for fixing a cable to the clamp base, wherein the arm of the robot includes a plurality of arm members, one of the plurality of arm members has a cylindrical shape elongated vertically, a rotary member configured to rotate about a central axis line of the cylindrical arm member is attached to a lower end portion of the cylindrical arm member, the base member is fixed to an upper end of the cylindrical arm member, and one end side of a cable fixed to the clamp base is disposed in a space within the cylindrical arm member.

\* \* \* \* \*